June 2, 1970    L. T. MAGNUSON ET AL    3,515,969
TRIGGER CIRCUIT FOR INVERTER
Filed July 15, 1968    3 Sheets-Sheet 1

Inventors:
Lee T. Magnuson
Alexander Kusko
John C. Baker
By
Dawson, Tilton, Fallon & Lungmus
Attys.

FIRING PULSE GENERATOR FOR THYRISTORS I & IV

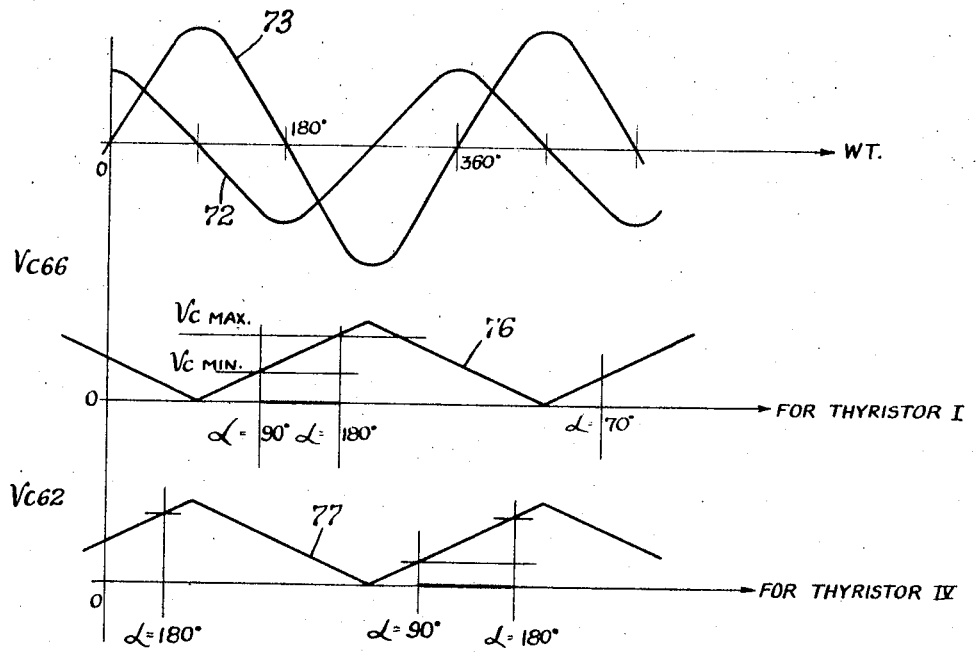
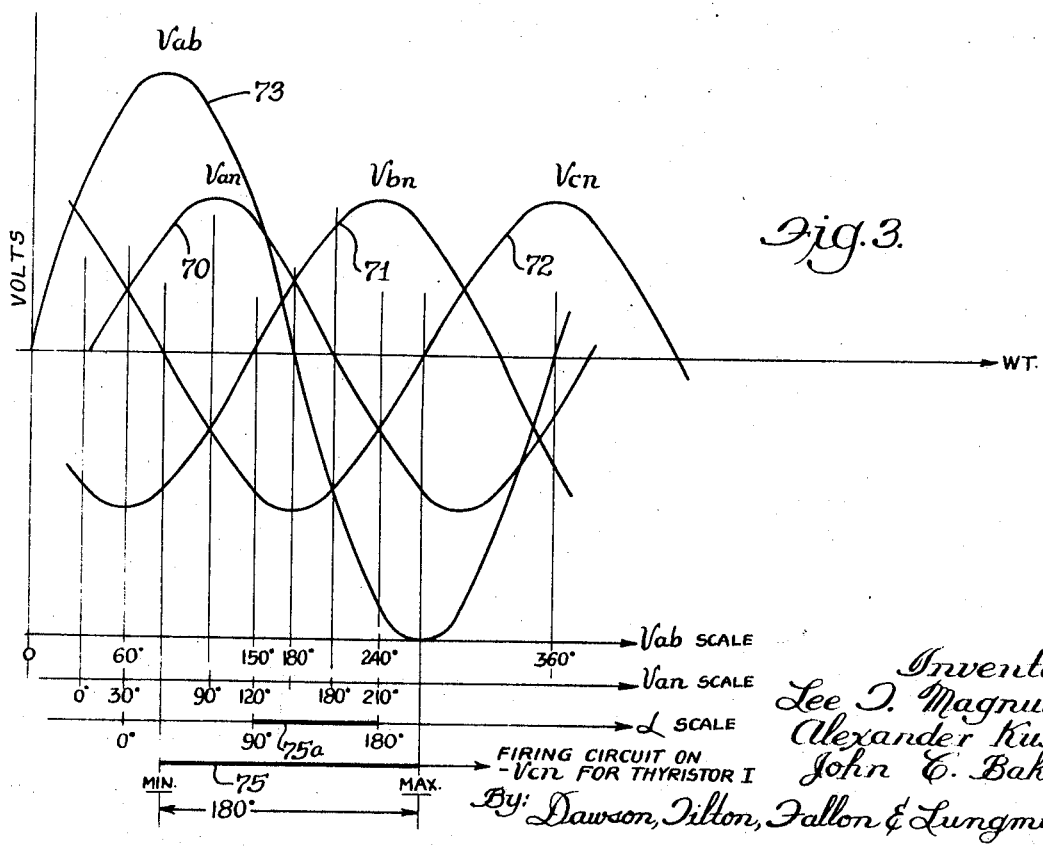

United States Patent Office 3,515,969
Patented June 2, 1970

3,515,969
TRIGGER CIRCUIT FOR INVERTER
Lee T. Magnuson, Davenport, Iowa, and Alexander Kusko, Newton Center, and John C. Baker, Carlisle, Mass., assignors to Deere & Company, Moline, Ill., a corporation of Delaware
Filed July 15, 1968, Ser. No. 744,726
Int. Cl. H02p 7/36
U.S. Cl. 318—195          7 Claims

ABSTRACT OF THE DISCLOSURE

A trigger circuit generates an output pulse which extends for a predetermined angular or phase duration of a sinusoidal source voltage. The relative angle for initiation of the trigger pulse is predetermined by a signal level representative of the desired firing angle; and this constant signal is fed to the trigger circuit. A controlled switch receives both the level signal and a ramp signal having a timed relation with the source for comparing them. When the ramp signal reaches a predetermined amplitude determined by the level signal, it fires the switch which permits a capacitor, on which a charge had been stored during the previous half-cycle of the source, to discharge through a pulse transformer which had been reset on the previous half-cycle of the source. As the frequency of the source decreases, so does the amplitude of the source and the magnitude of the voltage on the storage capacitor. The setting of the pulse transformer, which generates the output pulse, is extended over the same phase displacement relative to the source for a continuous range of source frequencies; and thus the output pulse width maintains a constant phase relation with the source.

BACKGROUND

The present invention relates to a trigger circuit; more particularly, it relates to a trigger circuit which is adapted to fire thyristors of a line-commutated inverter forming part of a control system for an induction motor.

In line-commutated inverter/wound-rotor induction motor systems of the type with which the present invention is particularly concerned, and which might be used in driving a self-propelled vehicle, a prime mover drives a conventional alternator which generates the required electrical energy. A control system triggers or fires each inverter switch into a conducting state at a predetermined angle relative to the alternator frequency; and the triggering circuits in the controller must maintain their associated thyristors in a conducting state for 120 electrical degrees relative to the alternator output voltage. As the vehicle changes speed, the frequency of the alternator will vary. For example, as the vehicle slows down, the frequency of the alternator will decrease, and so will its amplitude. Despite these changes, the triggering circuits must maintain conduction of their associated inverter thyristors for the 120° conduction angle.

SUMMARY

The trigger circuit of the present invention is particularly suited for use with a vehicular drive system disclosed in a co-pending, co-owned application of Magnuson and Kusko for Vehicular Drive System With Electric Assist, Ser. No. 730,541, filed May 20, 1968. Although the present invention is not so limited, it is believed that it will be more clearly illustrated and easily understood if it is described in the context of a particular control system. Thus, the above-mentioned co-pending application may be referred to for greater details; but certain functions performed by that system will be described herein as they relate to the present trigger circuit. It will be noted that the trigger circuit herein described is an integral part of that system and is particularly well suited to achieve the overall design objective thereof.

The system described in the above-identified application is used in conjunction with a prime mover which drives a primary transmission and a three-phase electrical alternator. The primary transmission drives directly the front two wheels of an earth-moving scraper; and the alternator supplies electrical energy to an auxiliary or assisting induction motor which is adapted to drive the other two wheels when the assisting system is activated by the operator. For example, if the vehicle falls below a predetermined speed so that the wheels driven by the primary transmission become traction-limited, the electric assist system can be engaged to produce a much higher drawbar pull at these lower speeds.

In that system, means are described for controlling the conduction angle of the inverter thyristors to generate a predetermined-desired motor output torque. This desired output torque is a function of motor speed; and the controller generates an electrical signal, the amplitude or magnitude of which is representative of a desired firing angle for the thyristors. As used herein, the term firing angle is always in relation to the frequency of the source which energizes the induction motor; and it will be understood that reference is always to electrical degrees as that term is commonly understood.

The thyristors of the inverter, as is known, are fired in a predetermined order and at intervals of 60°. Each thyristor is kept in a conducting state for 120°; and the inverter couples the circulating slip power back to the stator input of the motor. Thus, that energy which does not produce an output torque is re-circulated through the motor as slip energy.

There is a trigger circuit associated with each of the thyristors of the inverter; and they are grouped in sets of two so that each group is fired off of one of the primary phases of the three phase alternator. All thyristors are fired at the same angular displacement relative to its primary time base.

Each trigger circuit receives a signal level representative of a desired firing angle which signal is generated by the controller. The primary or source also generates a ramp voltage signal in the trigger circuit; and a controlled switch receives both the signal level representative of the desired firing angle and the ramp signal generated from its associated source. When the ramp signal equals a given level as determined by the amplitude of the level signal, the controlled switch conducts. Thus, as the level signal increases in magnitude, the firing angle is delayed because it will take a longer time for the ramp signal to reach that level.

When the switch conducts, it permits the discharge of a capacitor connected in circuit with it. The capacitor had been charged during the previous half-cycle of the source. A pulse transformer had also been reset during this previous half-cycle; and the discharge of the capacitor is transmitted through the pulse transformer to generate an output signal for triggering its associated thyristor. This trigger pulse terminates when the core material of the pulse transformer saturates. On the subsequent half-cycle of the primary source, the pulse transformer is reset again; and the ramp signal decreases to its original starting point.

The discharge time constant for the capacitor is at a relatively high value until the pulse transformer saturates; and then this time constant becomes relatively short so that once the pulse transformer saturates, further discharge of the storage capacitor is very rapid.

As mentioned, when the frequency of the source decreases, its amplitude diminishes; thus, the peak voltage to which the storage capacitor is charged becomes lower when the frequency of the source decreases. Since its discharge time constant does not vary with the freqency of the source voltage, as the amplitude and frequency of the source voltage decrease, the discharge of the storage capacitor takes place along a different, lower portion of its decay curve. Thus, for relatively high source voltages, the storage capacitor will decay in a relatively short time (which time is set to be 60 electrical degrees of the source frequency); and as the frequency and amplitude of the supply decreases, the storage capacitor, although discharging along the same time constant, will take a longer time to do so. This discharge time is maintained at 60 electrical degrees relative to the source. The inverter thyristor is triggered by the output pulse of the pulse transformer into a state of conduction for 120 electrical degrees of the primary frequency despite changes in that frequency over a design range.

Other features and advantages of the present invention will be obvious to persons skilled in the art from the following detailed description of a preferred embodiment accompanied by the attached drawing wherein identical reference numerals will refer to like parts in the various views.

THE DRAWING

FIG. 3 is an idealized plot of the source voltages to indicate the timing of the firing of the inverter thyristors;

FIG. 6 illustrates three idealized voltage-time diagrams illustrating the build-up of the ramp voltage in relation to the primary frequency.

DETAILED DESCRIPTION

Figure 1:
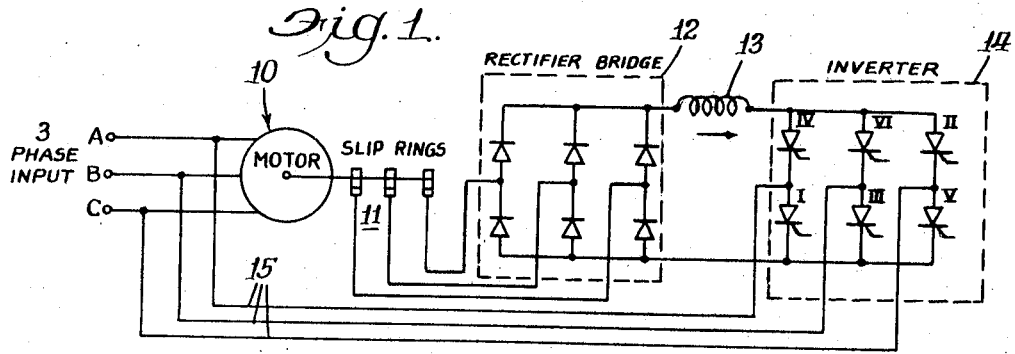
FIGS. 1-1A illustrate an electrical system, partially in block schematic form, incorporating the present invention.

Turning now to the drawing and particularly to FIG. 1, an induction motor is generally designated by reference numeral 10; and a three-phase voltage is coupled directly to the stator winding of the motor 10 from a source which is not shown. In the above-identified application the source is an alternator driven by a gas turbine engine.

The motor 10 has a wound rotor, the rotor circuit being coupled to the rotor by means of slip rings generally designated 11. A three-phase rectifier bridge, generally designated 12 and enclosed within dashed line, receives the rotor current passing through the slip rings 11 to generate a DC rotor current flowing through an inductor 13 in the direction of the arrow adjacent the inductor, and into the positive terminal of a conventional three-phase inverter circuit 14 which is also enclosed within dashed line. The inverter 14 is connected in circuit with the rectifier bridge 12 and the inductor 13 according to known technology; and it includes six silicon controlled rectifiers or thyristors. Three output leads of the inverter 14 are designated by reference numeral 15; and each of the leads 15 is coupled directly to the appropriate phase of the stator of the motor 10. The relative firing order of the thyristors of the inverter 14 is identified by a roman numeral (I-VI) associated therewith. The thyristors in the inverter circuit 14 include an anode, a cathode, and a gate lead. As is commonly known, when the anode is at a positive potential relative to the cathode and the potential of the gate lead is sufficiently positive relative to the cathode, the thyristor will conduct.

Figure 1A:
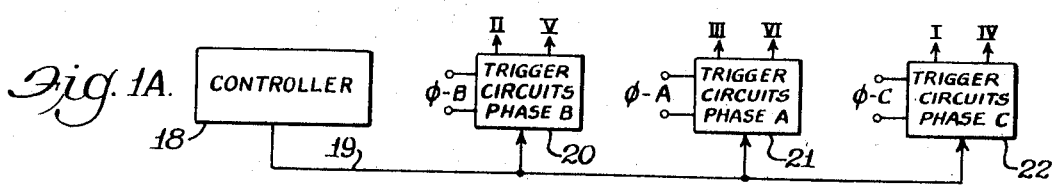

Referring now to FIG. 1A, a controller is schematically illustrated at 18; and it generates an output signal along an output line 19 to the input terminal or control lead of the trigger circuits, schematically represented by the blocks 20, 21 and 22.

Although the present invention is not so limited, the controller 18, as described in the above-identified copending application, generates its output signal as a function of the speed of the motor 10. The magnitude of the output signal along line 19 is representative of the difference between the desired torque for the instant motor speed and the actual torque at that speed. As the signal increases (indicating motor torque is greater than desired), the firing angle of the thyristors I-VI is advanced toward 180°.

Each of the thyristors I-VI of the inverter 14 is fired at the same angle relative to its primary source frequency. As indicated schematically in FIG. 1A, the trigger circuits are grouped into three sets of two. One set, schematically illustrated by the block 20 has a time base referenced against phase B of the source frequency; and it generates a trigger pulse for thyristor II and V. These two thyristors are triggered at a relative phase angle of 180°, and it will be remembered that each thyristor once triggered remains in a conducting state for 120°.

The second block 21 is referenced against the phase A primary signal; and it triggers thyristors III and VI. Block 22 is referenced against the phase C signal as a time base; and it triggers thyristor I and IV. Although FIG. 1A illustrates a single output lead associated with each of the thyristors I-VI, it will be understood that the output of each trigger circuit has a first lead connected to the gate terminal of its associated thyristor and a second lead connected to the cathode of its associated thyristor. Further, additional capacity may be achieved by using additional rectifier and inverter bridges in parallel with those shown and firing all thyristors from a common source by placing additional secondary windings on the pulse transformers of the trigger circuits.

Before discussing the overall systems operation, the structure of the trigger circuit will be disclosed in detail so that the timing relation between the trigger circuit, the controller, the source frequency and inverter operation may be better understood. The trigger circuits (block 22 of FIG. 1A) using phase C as a time base are seen in circuit schematic form in FIG. 2.

The input terminals of the trigger circuit are designated 25 and 26. The terminal 25 receives the previously-defined signal level from controller 18 which controls the firing angle for the inverter thyristors associated with the trigger circuits; and the input terminal 26 is a common or grounded lead. The phase C-to-neutral voltage is schematically represented by a generator 27 in FIG. 3; and this phase C voltage feeds a primary winding 28 of a transformer generally designated 29. The transformer 29 has a first secondary winding comprising center-tapped portions 30 and 31 and a second secondary winding 32 (located at the top of FIG. 2). The common terminal between portions 30 and 31 of the transformer 29 is connected to the control input lead 25. The dotted notation of the transformers shown herein have the customary meaning in circuit diagrams.

Figure 2:
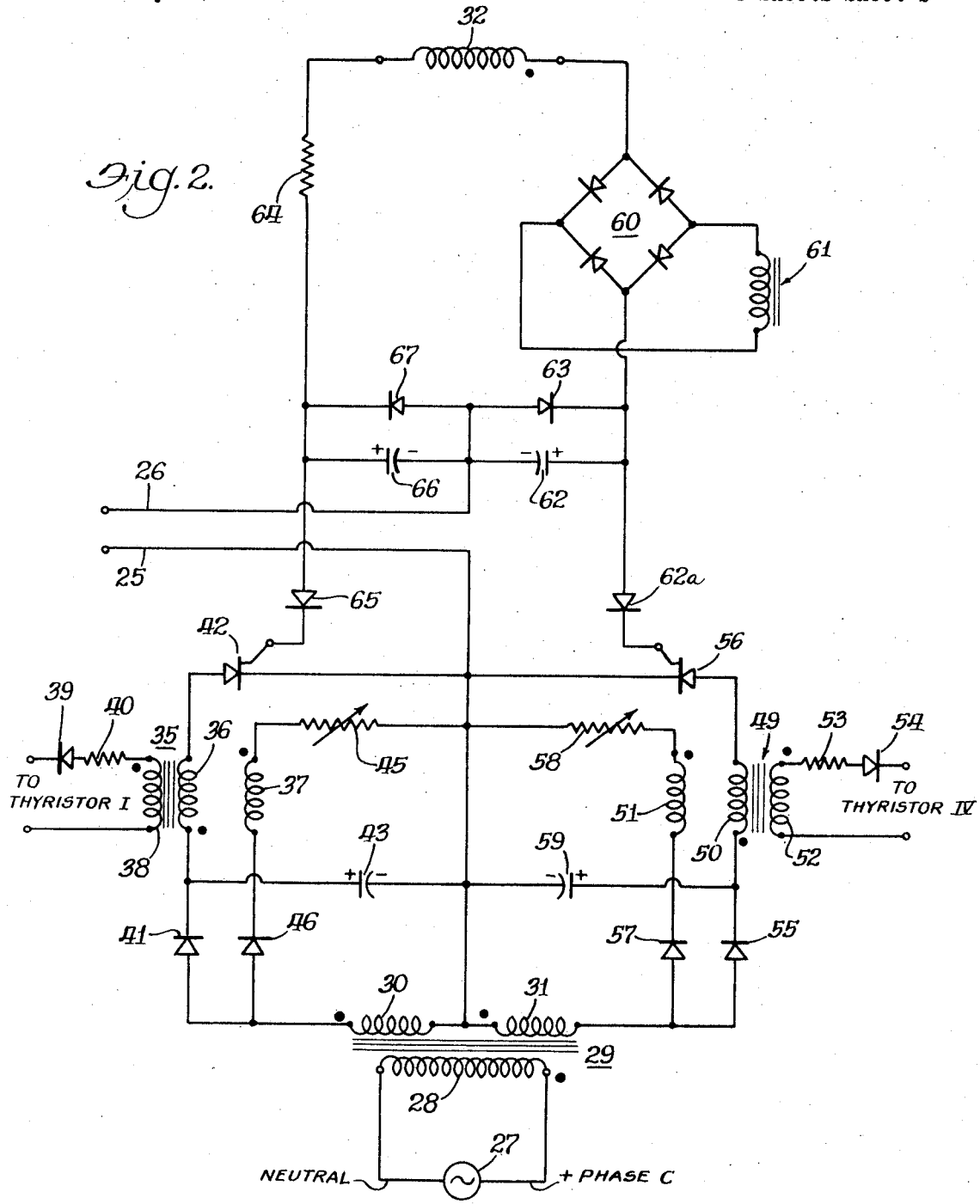
FIG. 2 is a detailed circuit schematic diagram of a complementary set of trigger circuits according to the present invention.

The left-hand portion of the trigger circuit shown in FIG. 2 generates a pulse for firing thyristor I of the inverter circuit; and the right-hand portion of this circuit generates a pulse for firing thyristor IV. The firing pulse for thyristor I is coupled through a first pulse transformer generally designated 35 and comprising a primary winding 36, a reset winding 37, and a secondary winding 38. One terminal of the secondary winding 38 is connected directly to the cathode of thyristor I; and the other terminal of the secondary winding 38 is connected to the anode of a diode 39 through a current-limiting resistor 40. The cathode of the diode 39 is connected to the gate lead of thyristor I.

A diode 41 couples the secondary winding 30 of the transformer 29 to the primary winding 36 of the pulse transformer 35 in the polarity shown. The other terminal of the primary winding 36 is connected to the anode of a thyristor 42. The cathode of the thyristor 42 is connected to the control lead of the triger circuit. A capacitor 43 is connected between the control lead of the trigger circuit and the cathode of the diode 41.

The reset winding 37 of the pulse transformer 35 is connected in series with a variable resistor 45 and a diode 46. The anode of the diode 46 is connected in common with the anode of the diode 41 and the secondary winding 30; and the other terminal of the resistor 45 is connected to the trigger circuit control lead 25.

Similarly, the right side of the circuit diagram shown in FIG. 2 includes a pulse transformer generally designated 49 having a primary winding 50, a reset winding 51, and a secondary winding 52. One terminal of the secondary winding 52 is connected directly to the cathode of thyristor IV; and the other terminal of the secondary winding 52 is coupled to the gate terminal of thyristor IV through a current limiting resistor 53 and a diode 54 connected in the polarity shown.

A diode 55 couples the secondary winding 31 to the primary winding 50 of the transformer 49. The other terminal of the primary winding 50 of the transformer 49 is coupled to the anode of the thyristor 56 having its cathode connected to the control lead 25. A diode 57 is connected in series circuit with the reset winding 51 of pulse transformer 49 and a variable resistor 58. This series circuit is connected between the common junction of the secondary winding 31 and anode of diode 55, and the control lead 25. A capacitor 59 is connected between the cathode of the diode 55 and the control lead 25.

Turning now to the upper portion of the trigger circuit as viewed in the drawing, the secondary 32 of the input transformer 29 is connected in series with a rectifying bridge generally designated 60, an inductor 61 and a diode 62a in the polarity shown to the gate terminal of the thyristor 56. The output terminal of the bridge circuit 60 is also connected to a capacitor 62 and the cathode of the diode 63. The other terminal of the capacitor 62 and the anode of the diode 63 are connected in common to the common input terminal 26 of the trigger circuit.

The other terminal of the secondary winding 32 is connected in series with a resistor 64 and the anode of a diode 65. The cathode of the diode 65 is connected to the gate terminal of thyristor 42. A capacitor 66 and a diode 67 are connected in parallel and in the polarity shown between the common terminal 26 and the anode of the diode 65.

Before discussing in detail the operation of the circuit of FIG. 2; an appreciation for the overall system timing should be had.

For a line-commutated inverter, such as the inverter 14 of FIG. 1, the inverter mode of operation is obtained for a firing angle ($\alpha$) between 90° and 180°, where $\alpha=0$ is defined as the firing angle for full DC output if the circuit were in the rectifying mode. The trigger circuit must be designed to cover the complete range of the inverter mode as well as some overlap.

The waveforms of the three line-to-neutral voltages, $V_{an'}$ $V_{bn'}$ and $V_{cn'}$ are designated respectively 70, 71, and 72 in FIG. 3; and one line-to-line voltage (namely, $V_{ab}$) is designated by reference numeral 73.

In FIG. 3, the abscissa is electrical radians (time); and the ordinate is voltage. At the bottom of FIG. 3, there are indicated a number of relative alternate abscissa scales to illustrate the phase relationship between the various voltages. As indicated in the drawing, the $\alpha$ scale begins when the line voltage $V_{ab}$ is at an angle of 60°, or when the phase A-to-neutral voltage, $V_{an}$ (curve 70), is 30°. Inverter operation occurs (referring to the $\alpha$ scale) when $\alpha$ is between 90° and 180°—that is, when the angle on curve 73 is between 150° and 240° and when the angle on curve 70 is between 120° and 210°. As previously mentioned, a full rectifier output of the inverter, if used as a bridge circuit, would occur for an angle of $\alpha=0$.

Each of the trigger circuits generates a firing pulse which lasts for 60° of a line-to-neutral voltage. The thyristor thus triggered conducts for 120° of the curve 72—that is, the voltage $V_{cn}$. The heavier black line 75 indicates the range of firing for thyristor I. The generator 27 shown in FIG. 2 schematically represents the line C-to-neutral voltage; and the heavier line 75a on the $\alpha$ scale represents the inverter region for thyristor I.

The timing developed in the trigger circuit can be appreciated from a consideration of the top portion of FIG. 6 wherein the curves 73 and 72 are repeated on a diminished amplitude scale. In the intermediate portion of FIG. 6, there is shown a symmetrical ramp voltage, indicated by reference numeral 76; and in the bottom portion of the diagram of FIG. 6, there is shown a ramp function 77 which is the inversion of that shown at 76. That is, when the ramp 76 is increasing, the ramp 77 is decreasing, and vice versa.

As will be made clear presently, the ramp 76 is the voltage across the capacitor 66 of FIG. 2; and the ramp 77 is the voltage which builds up across capacitor 62 in FIG. 2. The circuit is operated so that each of the ramp voltages 76 and 77 is in phase with a cusp (i.e. either the positive half-cycle or the negative half-cycle) of the line C-to-neutral voltage 72, starting at zero and rising to a maximum voltage at 180° later relative to the time base 72 and then decreasing to a minimum at 360° later.

Turning again to the circuit diagram of FIG. 2, only the detailed circuit operation in generating the impulse to thyristor I will be described in detail; and it will be understood that each of the other individual firing circuits operate in the same manner. For example, as already mentioned, the pulse transformer 35 will couple energy to fire thyristor I during the negative half cycle of voltage $V_{cn}$; and the pulse transformer 49 will couple the firing pulse to thyristor IV during the positive half cycle of the same voltage source.

During the positive half cycle of voltage $V_{cn}$ (generator 27 in FIG. 2), the dotted terminal of secondary winding 30 goes positive and diode 46 conducts to transmit current into the reset winding 37 of the pulse transformer 35 thereby resetting the flux level in the core of the transformer 35 to a particular level in order to obtain a desired pulse width. This will be more fully apreciated by referring to FIG. 5 which is an idealized plot of the hysteresis loop for the core material of transformer 35. As indicated therein, the B-H curve for the core material of the pulse transformers of the present invention is essentially a square hysteresis loop. That is, the change of flux density with increased current for the portions of the curve indicated by reference numerals 80 and 81 (i.e. the saturation regions) is negligible. However, the flux change in the intermediate portions indicated by reference numerals 82 and 83 is relatively great for a slight change in magnetizing current.

For convenience, movement of the operating point toward the saturation region 81 will sometimes be referred to as the "SETTING" condition of the pulse transformer; and the movement of the operating point toward the saturation region 80 will be referred to as the "RESETTING" condition of the pulse transformer.

Figure 5:
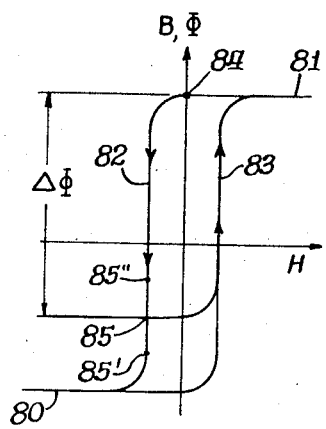
FIG. 5 is an idealized B-H diagram for the core material of the pulse transformer of FIG. 2.

When the reset current flows through the winding 37, the core starts the half cycle at the point indicated by reference numeral 84 in FIG. 5 and proceeds in the direction of the arrow along the portion 82 of the hysteresis curve down to a point indicated by reference numeral 85. Thus, the core material is reset to a predetermined flux level by the reset current. It will be observed that the magnitude of the reset current is adjusted by varying the resistance of the variable resistor 45 connected in series with the reset winding 37 of transformer 35.

During the same positive half cycle of voltage $V_{cn}$, the diode 41 conducts to charge the capacitor 43 in the polarity indicated to the peak voltage generated across the secondary winding 30 of the transformer 29. During this time, the thyristor 42 is in a non-conductive state.

It will be observed that the dotted terminal of the secondary winding 32 of transformer 29 is relatively positive during this half cycle of the source voltage so that current flows through the bridge 60, the inductor 61, the capacitors 62 and 66, and the resistor 64. The voltage generated across capacitor 62 is a positive-going ramp of the wave-form 77 as illustrated in the lower portion of FIG. 6. It will be observed that this positive half cycle of the voltage 72 shown in the top portion of FIG. 7 and previously identified as the phase C-to-neutral voltage. At the same time, of course, the capacitor 66 is discharging as was described above in connection with the voltage waveform 76 of FIG. 6; and diode 67 will conduct if the voltage across capacitor 66 tries to reverse its polarity.

During the negative half cycle of voltage $V_{cn}$, diodes 41 and 46 are reversed-biased and therefore in a non-conducting state. The voltage across the secondary winding 32 of the transformer 29 is also reversed; and the current through the bridge 60 and inductor 61 now begins to charge capacitor 66 along the positive-going ramp of the waveform as shown in the middle portion of FIG. 6. This positive ramp voltage is applied to the gate terminal of thyristor 42 through the diode 65. As already mentioned, the control voltage at the input terminal 25 of the trigger circuit is applied to the gate terminal of thyristor 42 through the diode 65.

When the ramp voltage generated across capacitor 66 in the polarity shown exceeds the input control voltage by the forward voltage drop across the diode 65 together with the forward voltage drop across the gate-cathode junction of thyristor 42, thyristor 42 will conduct. This permits the discharge of the energy previously stored in capacitor 43 through the primary winding 36 of the pulse transformer 35 for generating the output trigger pulse transmitted to thyristor I through the resistor 40 and the diode 39.

As the capacitor 43 discharges, the voltage across it decreases. At the same time, the flux density in the core of the transformer 35 rises toward saturation region 81 from the point 85 (see FIG. 5) along the line 83. When the transformer core saturates, the output pulse is abruptly terminated.

The width of the output pulse depends upon the degree to which the core was reset—that is, if, as previously described, the reset current had driven the core to the value of flux shown at 85′ in FIG. 5, the output pulse generated by the transformer would have been wider; whereas, if the reset current had driven the core material through the point 85″, the output pulse would have been narrower.

It will be noted that during the negative half cycle of the phase C voltage, the capacitor 59 on the complementary side of the trigger circuit shown in FIG. 2 is being charged and the reset winding 51 of the pulse transformer 49 is resetting its core material. The thyristor 56 is in a non-conductive state, and a linearly decreasing voltage is across the capacitor 62. Thus, during the next half cycle of the phase C voltage, the thyristor 56 will conduct to generate the output pulse which is transmitted to thyristor IV in the inverter.

Figure 4:
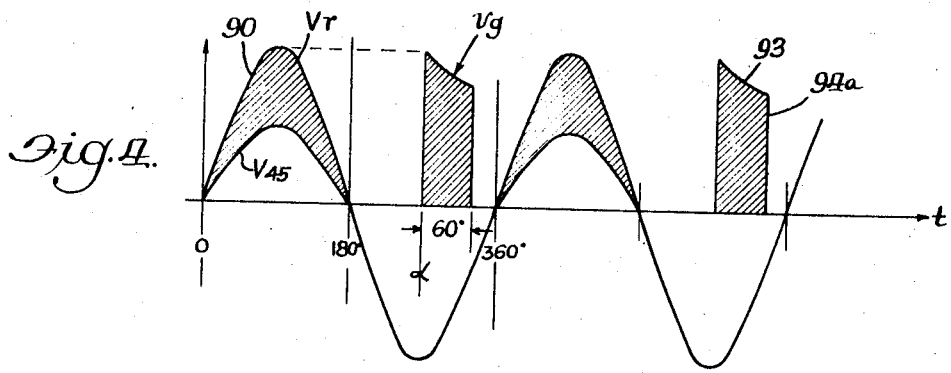
FIGS. 4-4A are idealized voltage-time plots illustrating a constant trigger pulse for two different source frequencies.
Figure 4A:
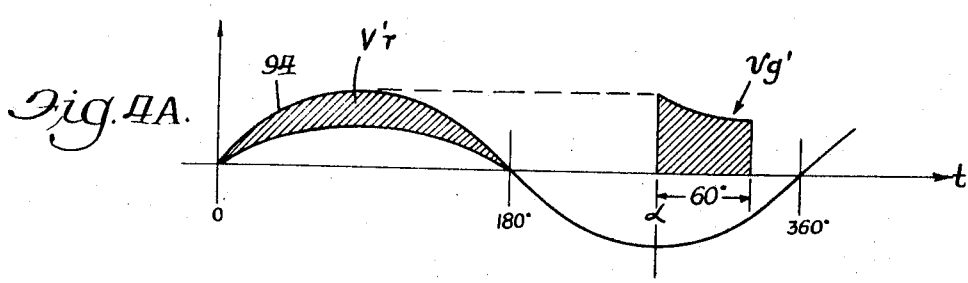

Turning now to FIGS. 4 and 4A, and keeping in mind the operation of the trigger circuit shown in FIG. 2, the manner in which the output pulse generated by the pulse transformers of the trigger circuits maintains a constant angular or phase duration relative to the source frequency will be explained. In this example, it will be assumed that the firing angle is at 270° of the phase C voltage (which is, of course, between 90° and 180° of $V_{an}$); and the explanation will relate in particular to the left-hand portion of the circuit shown in FIG. 2. That is, the portion which generates the output pulse to thyristor I in the inverter.

During this positive half cycle of the source voltage, the diode 46 is in a conductive state and current is transmitted through the reset winding 37 and the variable resistor 45. The voltage appearing across this series circuit is, of course, a sinusoidal voltage; and it is designated by the reference numeral 90 in FIG. 4. The major portion of this voltage is divided between the reset winding 37 and the resistor 45; and in FIG. 4, the portion of the voltage 90 indicated by the waveform $V_{45}$ is that which appears across the variable resistor 45; and the shaded portion of the waveform as indicated by $V_r$ is the voltage which appears across the rest winding 37. Again, these waveforms are shown as idealized waveforms when, for example, as is known in the art of magnetic amplifiers, the reset current is more likely to appear as a square wave. Here, the point is that the sum of these two voltages add up to the idealized sinusoidal waveform 90. This voltage $V_r$ drives the core material to the reset position 85 shown in FIG. 5; and the sum of $V_{45}$ and $V_r$ equals the voltage across the secondary winding 30 (less the small drop across the conducting diode 46).

The change in flux level produced by a voltage applied to a winding on the core is as follows:

$$v = N \frac{d\phi}{dt} \quad (1)$$

where $v$ is the voltage; N is the number of turns; $\Phi$ is the flux; and $t$ is time.

In integral form, Equation 1 becomes:

$$\frac{1}{N}\int_{t_1}^{t_2} v\, dt = \int_{\phi_1}^{\phi_2} d\phi \quad (2)$$

The left-hand side of Equation 2 is $1/N$ times the volt-time area of the applied voltage for the interval $t_1$ to $t_2$. The right-hand side is the flux change, $\Phi_2 - \Phi_1 = \Delta\Phi$. If the voltage is positive on the dotted terminal of the reset winding 37, then $\Delta\Phi$ is positive. Thus, the relationship is, $$1/Nx \text{ (volt-time area)} = \Delta\Phi \quad (3)$$

The shape of the voltage wave has no effect on the flux change, only its volt-time area ("area" here is used in the sense of an integral or product as defined in Equation 2 above) determines the change.

The shaded area of the first half cycle, marked $V_r$, in FIG. 4 is the volt-time area applied to the reset winding 37. FIG. 2 shows that the voltage is applied positively to the undotted terminal of the winding so that the flux change must be negative. The core starts the half cycle at point 84 in FIG. 5 and is driven down by $\Delta\Phi$ to point 85. The larger the volt-time area, the farther down the core state is driven.

The effect of the two different time constants is shown in FIG. 4 with the portion 93 indicating the relatively long decay time constant while the core is not saturated, and the falling edge 94a of the voltage $v_g$ indicating the rapid discharge of the storage capacitor after the core saturates.

The effect of reducing the frequency and the voltage of the source is shown in FIG. 4A wherein the voltage is designated 94. The reset volt-time area (i.e. the shaded area $V_r'$) is the same as it was before, so that the capacitor volt-time area ($v_g'$) applied to the gate winding is also the same. With half the amplitude, the capacitor pulse is twice as long, for a change from 400 c.p.s. to 200 c.p.s., but the angular pulse still remains at 60°. Hence, the circuit maintains constant output pulse width (i.e. angular direction or phase) relative to the source voltage.

During the generation of the firing pulse at the lower frequencies, the ramp voltage built up across the capacitor 66 (i.e. the voltage 76 shown at the middle of FIG. 6) will have a reduced slope so as to maintain a constant relative firing angle; but the reduced slope has no effect on the firing since the peak value to which the ramp voltage is climbing is independent of the frequency. The intersection between a given control voltage $V_c$ and the ramp will always occur at the same firing angle relative to the frequency. Preferably, the combination of the secondary winding 32 and the inductor 61 is such as to provide a current source, as distinguished from a voltage source, to generate the ramp voltage across capacitors 66 and 62.

The operation of the circuit has been described assuming the selection of component values and qualities is effected with a design to achieve the desired operation. It will, therefore, be appreciated that certain changes in operation, for example a phase shift in the idealized ramp voltage relative to its charging source frequency, present design problems of a nature easily corrected by a skilled circuit designer; and these certainly are contemplated as falling within the scope of the invention.

Having thus described in detail a preferred embodiment of the invention, it will be apparent to persons skilled in the art that certain modifications may be made to the circuit and certain equivalent components substituted for those described as well as adaptation of the principles thereof to inverter systems other than the one described; and it is therefore, intended that all such modifications and equivalents be covered as they are embraced within the spirit and scope of the appended claims.

We claim:

1. In a combination with a system for controlling an induction motor energized by a source of voltage and having a rectifier in its rotor circuit and an inverter including switches receiving the output of the rectifier for coupling slip energy back to the stator of said motor and control means generating a signal representative of a desired firing angle for said inverter switches, a circuit associated with each of said inverter switches for firing the same, comprising: first circuit means coupled to said source voltage to generate a timing signal representative of the timing of said source voltage; pulse generating means receiving said desired firing angle signal and said timing signal for generating a pulse signal when said timing signal reaches a value representative of a predetermined firing angle as determined by said firing angle signal, said pulse generating means including resettable means cooperating with said source voltage to maintain the phase duration of said pulse signal substantially constant relative to said source voltage over a range of frequency changes in said source; and second circuit means in circuit with said pulse-generating means to couple said pulse signal to the associated inverter thyristor to fire the same.

2. A system according to claim 1 wherein said source is characterized by having a decreasing amplitude as the frequency thereof decreases, and wherein said resettable means includes a pulse transformer having a core material characterized by a substantially square hysteresis loop and means for resetting said pulse transformer during each cycle of said source frequency, the volt-time area resetting said pulse transformer being equal to the volt-time area of the setting of the same; said circuit further including a capacitor in circuit with said pulse transformer and charged to a voltage determined by the amplitude of said source, said capacitor being adapted to discharge through said pulse transformer when said pulse-generating means is actuated; whereby, as the frequency of said source decreases, the voltage across said capacitor decreases and the setting of said pulse transformer maintains a constant phase duration relative to said source voltage over a range of frequencies thereof.

3. A system according to claim 2 wherein said signal representative of a desired firing angle for said inverter switches comprises a level signal having a magnitude representative of a desired firing angle, and wherein said timing signal comprises a ramp signal bearing a predetermined time relation with said source voltage; and wherein said pulse generating means includes a controlled switch having first and second power terminals and a control terminal, said ramp signal and said level signal being connected to said gate signal and one of said power terminals and said pulse transformer and said storage capacitor connected in circuit with said switch; whereby, as said ramp voltage reaches a predetermined magnitude as determined by said level signal, said switch will conduct thereby discharging said capacitor through said pulse transformer to generate said output pulse.

4. The system according to claim 2 characterized by said capacitor discharging from a relatively high potential when said source frequency is one value, and from a relatively low potential when said frequency decreases, the decay time constant being the same, whereby the decay time is longer for the lower frequencies to maintain said output pulse at a constant angular duration of said source.

5. A method for controlling an induction motor having a rectifier bridge in its rotor circuit and an inverter receiving the output of said rectifier for coupling slip energy back to the input of said motor, comprising: generating a first signal representative of a predetermined firing angle for the switches of said inverter relative to the source frequency for said motor; comparing said first signal with a second signal representative of the relative angular displacement of said source frequency; generating an output pulse for each of said inverter thyristors to fire the same at a predetermined angle of said source frequency as determined by said comparing step; and maintaining the volt-time area of said output pulse at a substantially constant value while increasing the time over which said pulse extends as the frequency of said source decreases.

6. The method of claim 5 wherein said last-named step comprises charging a capacitor to a voltage representative of the frequency of said source whereby as said source frequency decreases, the voltage to which said capacitor is charged decreases; discharging said capacitor through a pulse transformer at a predetermined angle of said source to generate an output pulse having a duration which increases as said source frequency decreases.

7. The method of claim 6 wherein said discharge angle of said capacitor is determined by comparing a first signal representative of a desired firing angle and a second signal representative of the phase of said source.

References Cited
UNITED STATES PATENTS

| | | | |
|---|---|---|---|
| 3,059,162 | 10/1962 | Humphrey | 318—237 XR |
| 3,136,937 | 6/1964 | Miljanic | 318—197 |
| 3,379,947 | 4/1968 | Lalonde | 318—237 |

ORIS L. RADER, Primary Examiner

G. F. RUBINSON, Assistant Examiner

U.S. Cl. X.R.

318—237